(12) United States Patent
Ochiai et al.

(10) Patent No.: US 12,435,216 B2
(45) Date of Patent: Oct. 7, 2025

(54) PHENOL RESIN COMPOSITION

(71) Applicant: SUMITOMO BAKELITE CO., LTD., Tokyo (JP)

(72) Inventors: Yuki Ochiai, Tokyo (JP); Shunsuke Mochizuki, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 761 days.

(21) Appl. No.: 17/631,712

(22) PCT Filed: Aug. 6, 2020

(86) PCT No.: PCT/JP2020/030220
§ 371 (c)(1),
(2) Date: Jan. 31, 2022

(87) PCT Pub. No.: WO2021/025124
PCT Pub. Date: Feb. 11, 2021

(65) Prior Publication Data
US 2022/0267586 A1 Aug. 25, 2022

(30) Foreign Application Priority Data

Aug. 8, 2019 (JP) .................................. 2019-146715

(51) Int. Cl.
*C08L 61/06* (2006.01)

(52) U.S. Cl.
CPC ......... *C08L 61/06* (2013.01); *C08L 2205/025* (2013.01); *C08L 2205/035* (2013.01)

(58) Field of Classification Search
None
See application file for complete search history.

(56) References Cited

U.S. PATENT DOCUMENTS 9,987,817 B2 6/2018 Takihana et al.
2016/0303820 A1* 10/2016 Takihana .............. B32B 15/098

FOREIGN PATENT DOCUMENTS

| JP | S51-061442 A | 5/1976 |
| JP | S51-139870 A | 12/1976 |
| JP | S55-66932 A | 5/1980 |
| JP | S58-157877 A | 9/1983 |
| JP | S62-33779 A | 2/1987 |
| JP | S62-169492 A | 7/1987 |
| JP | H05-059587 A | 3/1993 |
| JP | H05-230276 A | 9/1993 |
| JP | H06-322546 A | 11/1994 |
| JP | H1-165116 A | 3/1999 |
| JP | 2005-075882 A | 3/2005 |
| JP | 2017-226807 A | 12/2017 |
| JP | 2018-058960 A | 4/2018 |
| WO | 2015/087720 A1 | 6/2015 |
| WO | 2015/087722 A1 | 6/2015 |

OTHER PUBLICATIONS

International Search Report dated Oct. 20, 2020, issued in counterpart International application No. PCT/JP2020/030220, with English translation. (7 pages).

* cited by examiner

*Primary Examiner* — Sheeba Ahmed
(74) *Attorney, Agent, or Firm* — WHDA, LLP

(57) ABSTRACT

A phenol resin composition used in a resin molded body for which a plating process is applied to a surface includes component (A), which is phenol resin and component (B), which is calcium carbonate.

14 Claims, 1 Drawing Sheet

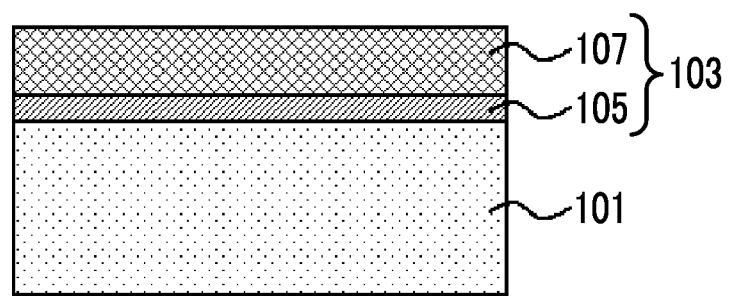
100

PHENOL RESIN COMPOSITION

TECHNICAL FIELD

The present invention relates to a phenol resin composition.

BACKGROUND ART

Patent Document 1 (Japanese Unexamined Patent Publication No. 2018-58960) describes a technique which attempts to improve adhesion between a thermosetting resin molded body and a plating film. This document describes a resin composition for sealing containing an epoxy resin, a phenol compound, and an aromatic monocarboxylic acid having a specific electron-withdrawing functional group and that it is possible for a sealing material produced using the above composition to have high adhesion to a plated lead frame at high temperatures.

In addition, Patent Document 2 (Japanese Unexamined Patent Publication No. H5-59587) is another example describing a method for plating plastics. The above document describes mixing calcium carbonate fine particles with a particle diameter of 10 μm or less into resins for which plating is difficult, such as polyethylene resin and polypropylene resin, to carry out molding and then processing the molded product by a normal ABS resin plating step, including a chemical etching process, and that, due to this, it is possible to use the normal ABS resin plating step and equipment as they are to adhere a plating layer to polyethylene resin, polypropylene resin, or the like, for which plating is difficult.

RELATED DOCUMENT

Patent Document

[Patent Document 1] Japanese Unexamined Patent Publication No. 2018-58960
[Patent Document 2] Japanese Unexamined Patent Publication No. H5-59587

SUMMARY OF THE INVENTION

Technical Problem

When the present inventors examined the techniques described in the Patent Documents described above, it was clear that there is still room for improvement in terms of improving the adhesion between a resin molded body and a plating film when a plating process is applied to a surface of the resin molded body.

Solution to Problem

According to the present invention, there is provided a phenol resin composition used in a resin molded body for which a plating process is applied to a surface, the phenol resin composition including the following components (A) and (B).
(A) A phenol resin
(B) Calcium carbonate
In addition, according to the present invention, there is provided a molded body including a cured product of the phenol resin composition of the present invention described above, and a plating layer provided in contact with a surface of the cured product.

Advantageous Effects of Invention

According to the present invention, it is possible to improve adhesion between a resin molded body and a plating film when a plating process is applied to a surface of the resin molded body.

BRIEF DESCRIPTION OF THE DRAWINGS

FIG. 1 is a cross-sectional view showing a configuration example of a molded body in an embodiment.

DESCRIPTION OF EMBODIMENTS

A description will be given below of embodiments of the present invention using drawings. In all drawings, similar components are marked with common reference numerals and explanation thereof will not be repeated as appropriate. Unless otherwise noted, "A to B" in a numerical range represents A or more and B or less and includes the numerical values at both ends. In addition, in the present embodiment, it is possible for the composition to include each component alone or in a combination of two or more.

(Phenol Resin Composition) A phenol resin composition (referred to below simply as "resin composition" as appropriate) is a resin composition which is used for a resin molded body for which a plating process is applied on a surface and which includes the following components (A) and (B).
(A) A phenol resin
(B) Calcium carbonate
In the present embodiment, the resin composition is specifically a thermosetting resin composition.

A description will be given below of the components of the resin composition with specific examples.
(Component (A))
Component (A) is a phenol resin.
The component (A) may be, for example, any component used as a molding material and specific examples thereof include one or two or more selected from the group consisting of resol-type phenol resins and novolac-type phenol resins.

From the viewpoint of improving adhesion to the plating film formed on the surface of the resin molded body, the component (A) more preferably includes a resol-type phenol resin and a novolac-type phenol resin, and is more preferably a resol-type phenol resin and a novolac-type phenol resin.

Among the above, including the resol-type phenol resin in the component (A) makes it possible to improve the adhesion to the plating film formed on the surface of the resin molded body, to moderately increase the cross-link density of the resin molded body, to improve the toughness of the resin molded body, and to improve the mechanical strength. In addition, since it is possible to moderately improve the cross-link density in this manner, it is possible to efficiently suppress dimensional changes in the resin molded body due to water and moisture absorption.

It is possible to obtain resol-type phenol resins, for example, by reacting phenols and aldehydes in the presence of a basic catalyst, usually at a molar ratio of aldehydes with respect to phenols (aldehydes/phenols) of 1.3 to 1.7.

Here, examples of the phenols used when manufacturing resol-type phenol resins include one or two or more phenol compounds selected from the group consisting of phenol, o-cresol, m-cresol, p-cresol, xylenol, alkylphenols, catechol, and resorcinol.

In addition, examples of aldehydes used when manufacturing resol-type phenol resins include aldehyde compounds such as formaldehyde, paraformaldehyde, and benzaldehyde, substances which are the sources of these aldehyde compounds, or solutions of these aldehyde compounds.

From the viewpoint of improving the heat resistance of the resin molded body and from the viewpoint of suppressing dimensional changes in the resin molded body due to water and moisture absorption, when the component (A) includes a resol-type phenol resin, the content thereof is more than 0% by mass with respect to the entire component (A) included in the resin composition, preferably 50% by mass or more, more preferably 60% by mass or more, even more preferably 70% by mass or more, and yet more preferably 75% by mass or more.

In addition, from the viewpoint of suppressing dimensional changes in the resin molded body due to heating, the content of the resol-type phenol resin is 100% by mass or less with respect to the entire component (A) included in the resin composition, preferably 95% by mass or less, more preferably 90% by mass or less, even more preferably 85% by mass or less, and yet more preferably 80% by mass or less.

In addition, the component (A) including a novolac-type phenol resin makes it possible to improve the adhesion to the plating film formed on the surface of the resin molded body and to improve the mechanical strength of the resin molded body.

Examples of the novolac-type phenol resin include phenol novolac resin, cresol novolac resin, and bisphenol novolac resin.

From the viewpoint of increasing the adhesion to the plating film formed on the surface of the resin molded body as well as increasing the mechanical strength of the resin molded body, the novolac-type phenol resin preferably includes one or two or more resins selected from the group consisting of the resin represented by General Formula (1) and the resin represented by General Formula (2).

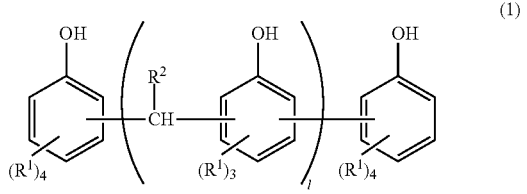

(In General Formula (1), $R^1$ each independently represents a hydrogen atom, a hydroxyl group, an alkyl group having 1 to 10 carbon atoms, a cycloalkyl group having 1 to 10 carbon atoms, or an aryl group or a substituted aryl group having 6 to 10 carbon atoms, $R^2$ each independently represents a hydrogen atom, an alkyl group having 1 to 10 carbon atoms, a cycloalkyl group having 1 to 10 carbon atoms, or an aryl group or substituted aryl group having 6 to 10 carbon atoms, and l is a number of 1 or more and 10 or less.)

For example, it is possible to appropriately select the resins shown in General Formula (1) from resins obtained by reacting phenols with aldehydes, for example, without a catalyst or in the presence of an acidic catalyst, in accordance with the application. More specifically, it is possible to use a random novolac-type or high-ortho novolac-type phenol resin as the resin shown in General Formula (1).

Usually, it is possible to obtain this novolac-type phenol resin by carrying out the reaction while controlling the molar ratio (aldehydes/phenols) of the aldehydes with respect to the phenols to be 0.7 to 0.9.

Specific examples of phenols used when preparing the resin shown in General Formula (1) include phenol, o-cresol, m-cresol, p-cresol, xylenol, alkylphenols, catechol, and resorcinol.

In addition, examples of aldehydes used when preparing the resin shown in General Formula (1) include aldehyde compounds such as formaldehyde, paraformaldehyde, and benzaldehyde, substances which are the sources of these aldehyde compounds, or solutions of these aldehyde compounds.

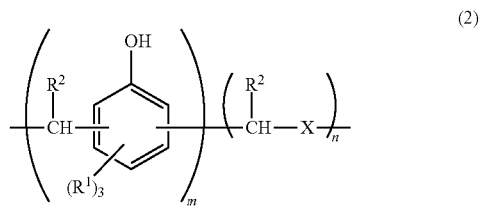

(In General Formula (2), $R^1$ each independently represents a hydrogen atom, a hydroxyl group, an alkyl group having 1 to 10 carbon atoms, a cycloalkyl group having 1 to 10 carbon atoms, or an aryl group or substituted aryl group having 6 to 10 carbon atoms, $R^2$ each independently represents a hydrogen atom, an alkyl group having 1 to 10 carbon atoms, a cycloalkyl group having 1 to 10 carbon atoms, or an aryl group or a substituted aryl group having 6 to 10 carbon atoms, group X is a divalent group selected from the groups represented by General Formulas (3) to (5), m is a number of 1 or more and 10 or less, and n is a number of 1 or more and 10 or less.)

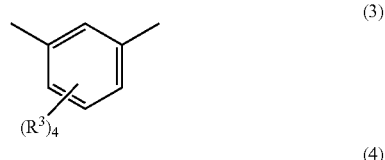

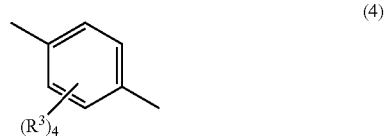

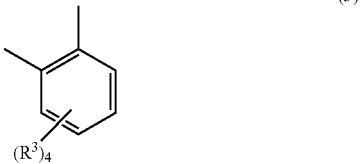

(In General Formulas (3) to (5), $R^3$ are each independently a hydrogen atom, an alkyl group having 1 to 10 carbon atoms, or a cycloalkyl group having 1 to 10 carbon atoms.)

As specific examples of the method for preparing the resin shown in General Formula (2), for the benzene-modified phenol resin corresponding to a case where $R^3$ in General Formula (3) to (5) are all hydrogen atoms, preparation is possible by reacting para-xylene dimethyl ether with phenols in the presence of an acidic catalyst, for example. In addition, in a case of a substituted benzene-modified phenol resin in which $R^3$ in General Formulas (3) to (5) corresponds to an alkyl group with 1 to 10 carbon atoms or a cycloalkyl group with 1 to 10 carbon atoms, preparation is possible by first reacting substituted benzene with aldehydes in the presence of an acidic catalyst and then reacting the obtained polymer with phenols or phenols and aldehydes with an acidic catalyst.

In this manner, it is possible to intercalate a structural unit derived from benzene or substituted benzene in the repeating units of the novolac-type phenol resin.

Although the terminal structural unit is not shown in General Formula (2), such a structural unit may be both a structural unit derived from phenols and a structural unit derived from benzene or substituted benzene.

In addition, the modification ratio of the resin shown in General Formula (2) is defined as the ratio of n with respect to the sum of m and n in General Formula (2), that is, the value of (n/(m+n)). It is possible to appropriately adjust this modification ratio according to the usage application or the like; however, from the viewpoint of controlling the crosslink density to be moderate when producing a resin molded body from the phenol resin composition, the modification ratio is, for example, 0.15 or more, and preferably 0.20 or more, and, for example, 0.60 or less, and preferably 0.50 or less.

Specific examples of phenols used when preparing the resin shown in General Formula (2) include phenol, o-cresol, m-cresol, p-cresol, xylenol, alkylphenols, catechol, resorcinol, and the like. These phenols may be used alone or in a mixture of two or more.

As aldehydes used when preparing the resins shown in General Formula (2), for example, it is possible to use aldehyde compounds such as formaldehyde, paraformaldehyde, and benzaldehyde, substances which are sources of these aldehyde compounds, solutions of these aldehyde compounds, and the like. These aldehydes may be used alone or in a mixture of two or more.

In addition, examples of substituted benzene used when preparing the resin shown in General Formula (2) include toluene, xylene, mesitylene, and cyclohexylbenzene.

When preparing the resin shown in General Formula (2), due to a high ease of availability, benzene, or toluene or xylene among the substituted benzenes described above, is employed and, as the phenols, a phenol in which all $R^1$ groups are hydrogen atoms is employed to prepare a benzene-modified novolac-type phenol resin, a toluene-modified novolac-type phenol resin, or a xylene-modified novolac-type phenol resin and it is preferable to use the above as the resin shown in General Formula (2).

From the viewpoint of making the processability of the resin molded body preferable, when the component (A) includes a novolac-type phenol resin, the content thereof is more than 0% by mass with respect to the entire component (A) included in the resin composition, preferably 5% by mass or more, more preferably 10% by mass or more, even more preferably 15% by mass or more, and yet more preferably 20% by mass or more.

In addition, from the viewpoint of improving the mechanical strength of the resin molded body, the content of the novolac-type phenol resin is 100% by mass or less with respect to the entire component (A) included in the resin composition, preferably 50% by mass or less, more preferably 40% by mass or less, even more preferably 35% by mass or less, yet more preferably 30% by mass or less, and still more preferably 20% by mass or less.

From the viewpoint of improving the curing characteristics of the resin composition, the content of the component (A) in the resin composition is preferably 10% by mass or more with respect to the entire resin composition, more preferably 20% by mass or more, and even more preferably 30% by mass or more.

In addition, from the viewpoint of improving the adhesion to the plating film formed on the surface of the resin molded body, the content of the component (A) in the resin composition may be, for example, 99% by mass or less with respect to the entire resin composition, preferably 90% by mass or less, more preferably 80% by mass or less, even more preferably 70% by mass or less, yet more preferably 60% by mass or less, and still more preferably 50% by mass or less.

(Component (B))

The component (B) is calcium carbonate.

The shape of the calcium carbonate is not limited and, for example, it is possible to use granular calcium carbonate such as a spherical calcium carbonate.

From the viewpoint of improving adhesion between the resin molded body and the plating film, the average particle diameter $d_0$ of the component (B) is preferably 0.1 µm or more, more preferably 0.5 µm or more, and even more preferably 1.0 µm or more, and is preferably 30 µm or less, more preferably 20 µm or less, and even more preferably 10 µm or less.

In addition, from the same viewpoint, the component (B) may include components with a large particle diameter and components with a small particle diameter.

For example, in component (B), the ratio of particles having a particle diameter of 0.1 µm or more and 1 µm or less may preferably be 5% or more with respect to the entire component (B), and more preferably 25% or more, and preferably 45% or less, and more preferably 30% or less.

In addition, in component (B), the ratio of particles having a particle diameter of 1 µm or more and 10 µm or less is preferably 10% or more with respect to the entire component (B), and more preferably 45% or more, and preferably 80% or less, and may also be 60% or less, for example.

Here, for the average particle diameter $d_{50}$ and other particle size characteristics of the calcium carbonate, it is possible to measure the particle size distribution of the particles on a volume basis using a commercially available laser diffraction particle size analyzer (for example, SALD-7000 manufactured by Shimadzu Corporation). Here, it is possible to use the obtained median diameter ($d_{50}$) as the average particle diameter.

From the viewpoint of improving the adhesion between the resin molded body and the plating film, the content of the component (B) in the resin composition is preferably 1% by mass or more with respect to the entire resin composition, more preferably 2% by mass or more, even more preferably 5% by mass or more, and yet more preferably 7% by mass or more.

In addition, from the viewpoint of improving the strength of the resin molded body, the content of the component (B) in the resin composition is preferably 50% by mass or less with respect to the entire resin composition, more preferably 30% by mass or less, even more preferably 20% by mass or less, and yet more preferably 15% by mass or less.

In the present embodiment, since the resin composition includes the components (A) and (B), it is possible to effectively improve the adhesion between the resin molded body and the plating film when a plating process is applied to the surface of the resin molded body formed of the cured product of the resin composition. For this reason, the resin composition of the present embodiment is suitably used to obtain a resin molded body for which a plating process is applied on a surface.

From the viewpoint of improving the temperature cycling reliability of the molded body obtained by applying a plating process to the surface of the resin molded body, for a cured product obtainable by molding the resin composition at 175° C. for 3 minutes and then carrying out curing at 180° C. for 4 hours, the linear expansion coefficient in the range of 40° C. to 150° C., measured by thermomechanical analysis (TMA) at a temperature rise rate of 5° C./min is preferably 5 ppm/° C. or higher, more preferably 8 ppm/° C. or higher, and even more preferably 10 ppm/° C. or higher, and, for example, may be 70 ppm/° C. or lower, preferably 30 ppm/° C. or lower, more preferably 25 ppm/° C. or lower, even more preferably 20 ppm/° C. or lower, and yet more preferably 18 ppm/° C. or lower.

In addition, when a strength obtained when a cured product obtainable by molding the resin composition at 175° C. for 3 minutes and then carrying out curing at 180° C. for 4 hours is used as a test piece and the test piece is broken by a method in accordance with JIS K 6911 is set as the flexural strength, the flexural strength of the cured product is preferably 50 MPa or more, more preferably 100 MPa or more. With such a flexural strength, it is possible to further increase the adhesion to the plating film and to further improve the mechanical strength of the resin molded body.

In addition, when a strength obtained when a cured product obtainable by molding the resin composition at 175° C. for 3 minutes and then carrying out curing at 180° C. for 4 hours is used as a test piece and the test piece is broken by a method in accordance with JIS K 6911 is set as the flexural strength, the flexural modulus of the cured product, as determined from the slope of the stress-strain curve in the elastic region, is preferably 10.0 GPa or more, and more preferably 12.0 GPa or more. With such a flexural modulus, it is possible to further increase the adhesion to the plating film and to further improve the mechanical strength of the resin molded body.

In the present embodiment, the resin composition may include components other than the components (A) and (B).

(Component (C))

Component (C) is an elastomer. The resin composition further including the component (C) makes it possible to more stably obtain a resin molded body having excellent adhesion to a plating film.

The component (C) is preferably soluble in acid.

Specific examples of the component (C) include one or two or more selected from the group consisting of a butadiene rubber, a butadiene acrylonitrile copolymer, and a modified polyvinyl alcohol such as alkyl acetalized polyvinyl alcohol.

From the viewpoint of improving the adhesion between the resin molded body and the plating film, the component (C) preferably includes one or two or more selected from the group consisting of a butadiene rubber, a butadiene acrylonitrile copolymer, and a modified polyvinyl alcohol.

From the viewpoint of improving the adhesion between the resin molded body and the plating film, the content of the component (C) in the resin composition is preferably 0.5% by mass or more with respect to the entire resin composition, more preferably 1% by mass or more, even more preferably 1.5% by mass or more, and yet more preferably 2.5% by mass or more.

In addition, from the viewpoint of improving the strength of the resin molded body, the content of the component (C) in the resin composition is preferably 10% by mass or less with respect to the entire resin composition, more preferably 8% by mass or less, even more preferably 6% by mass or less, and yet more preferably 4% by mass or less.

(Filler)

The resin composition may include a filler other than the component (B). Examples of the shape of the filler include a fibrous shape or a granular shape, such as a spherical shape.

Specific examples of fibrous shape fillers include glass fiber, carbon fiber, fibrous wollastonite, and rock wool. It is possible to set the average fiber diameter of the fibrous shape filler to be, for example, 10 μm to 15 μm, and the average fiber length to be, for example, 20 μm to 5000 μm. The use of such a fibrous shape filler makes it possible to improve the workability during the manufacturing of the resin composition and also to further improve the mechanical strength of the resin molded body.

In addition, specific examples of granular fillers include spherical glass such as glass beads and glass powder, silica such as spherical silica and crushed silica, aluminum hydroxide, clay, and mica.

From the viewpoint of improving adhesion to the plating film formed on the surface of the resin molded body as well as improving the mechanical strength of the resin molded body, the resin composition preferably includes an inorganic filler, and more preferably includes glass fibers.

From the viewpoint of improving the mechanical strength of the resin molded body, the content of the filler other than the component (B) in the resin composition is preferably 0.5% by mass or more with respect to the entire resin composition, more preferably by mass or more, even more preferably 1.5% by mass or more, and yet more preferably 2.5% by mass or more.

In addition, from the viewpoint of improving the curing characteristics of the resin composition, the content of the filler other than the component (B) in the resin composition is preferably 70% by mass or less with respect to the entire resin composition, more preferably 60% by mass or less, even more preferably 55% by mass or less, and yet more preferably 50% by mass or less.

In addition, the resin composition may include a resin component other than the component (A). Such a resin component is, for example, one or two or more selected from the group consisting of a resin having a triazine ring such as urea (urea) resin and melamine resin, bismaleimide (BMI) resin, polyurethane resin, silicone resin, resin having a benzoxazine ring, cyanate ester resin, polyvinyl butyral resin, and polyvinyl acetate resin.

In addition, the resin composition may also include, for example, various additives used in thermosetting resin molding materials. Specific examples of additives include mold release agents such as stearic acid, calcium stearate, magnesium stearate, carnauba wax, and polyethylene; curing aids such as magnesium oxide and calcium hydroxide (slaked lime); coloring agents such as carbon black; adhesion improvers or coupling agents to improve the adhesion between the filler and the thermosetting resin; and solvents.

The content of each of these components in the resin composition is, for example, approximately 0.1% by mass to 5% by mass with respect to the entire resin composition.

(Resin Molded Body)

The resin molded body (molded product) is formed of the cured product of the resin composition described above.

In addition, it is possible to obtain the resin molded body by molding the resin composition described above. The molding method is preferably transfer molding or injection molding.

At this time, the conditions depend on the thickness of the resin molded body, for example, in a case of molding a thick-walled molded product of approximately 5 mm by injection molding, it is possible to adopt conditions of a mold temperature of 170° C. to 190° C., a molding pressure of 100 MPa to 150 MPa, and a curing time of 30 seconds to 90 seconds.

In addition, it is possible to perform after-baking on the obtained resin molded body as necessary and to select the conditions for after-baking as appropriate for the application. For example, it is possible to set the maximum attainable temperature to from 150° C. to 270° C. and the holding time to from 1 hour to 15 hours. More preferably, it is possible to set the maximum attainable temperature to from 170° C. to 240° C. and the holding time to from 1 hour to 10 hours. The higher the temperature at which the after-baking is performed, the smaller the change in heating dimensions in the use environment tends to be.

In addition, from the viewpoint of further improving the adhesion between the resin molded body and the plating film, the resin molded body preferably has a sea-island structure, and the resin molded body more preferably has a sea-island structure and the component (C) is present in the island phase.

Here, it is possible to confirm the sea-island structure by electron microscopic observation.

(Molded Body)

The molded body has a cured product of the resin composition described above and a plating layer provided in contact with the surface of the cured product.

FIG. 1 shows a cross-sectional view showing a configuration example of the molded body in an embodiment. A molded body 100 shown in FIG. 1 has a resin molded body 101 formed of a cured product of a resin composition and a plating layer 103 provided in contact with the surface of the resin molded body 101.

In addition, the plating layer 103 may be formed of one layer or may have a plurality of layers, for example, FIG. 1 shows a configuration in which the plating layer 103 includes a first plating layer 105 and a second plating layer 107 from the resin molded body 101 side.

In addition, the plating layer 103 is preferably provided over the entire surface of the resin molded body 101.

The methods for plating the first plating layer 105 and the second plating layer 107 may be the same or different.

From the viewpoint of improving the adhesion between the resin molded body and the plating layer 103, the first plating layer 105 is specifically an electroless plating layer. In addition, the second plating layer 107 may be an electroless plating layer or an electrolytic plating layer.

In addition, the first plating layer 105 and the second plating layer 107 are specifically metal layers, for example, these layers are independently layers including one or two or more selected from the group consisting of Cu, Ni, Al, Fe, Au, and alloys thereof.

From the viewpoint of improving the adhesion between the resin molded body and the plating layer 103, preferably, one of the first plating layer 105 and the second plating layer 107 is a Ni film and the other is a Cu film.

From the viewpoint of improving the adhesion between the resin molded body 101 and the plating layer 103, the resin molded body 101 preferably has a roughened layer on the bonding surface with the plating layer 103 and the plating layer 103 is provided inside a recess provided in the roughened layer.

From the viewpoint of improving adhesion to the plating layer 107 and improving the electromagnetic wave shielding properties, the thickness of the first plating layer 105 is preferably 0.1 µm or more, and more preferably 0.3 µm or more, and preferably 5 µm or less, and more preferably approximately 3 µm.

From the viewpoint of improving the electromagnetic wave shielding properties, the thickness of the second plating layer 107 is preferably 0.5 µm or more, and more preferably 1 µm or more, and preferably 50 µm or less, and more preferably 30 µm or less.

In addition, from the viewpoint of improving the electromagnetic wave shielding properties, the thickness of the entire plating layer 103 is preferably 0.1 µm or more, and more preferably 0.5 µm or more, and preferably 60 µm or less, and more preferably 30 µm or less. [0061]

Next, a description will be given of the method for manufacturing the molded body 100. The method for manufacturing a molded body includes, for example, a step of preparing a cured product of the resin composition described above, that is, the resin molded body 101, a step of etching and roughening the surface of the resin molded body 101, and a step of forming the plating layer 103 on the roughened surface.

The step of etching and roughening the surface of the resin molded body 101 is specifically a step in which the surface on which the plating layer 103 is to be formed is etched prior to the plating process to dissolve and remove calcium, carbonate present in the vicinity of the surface of the resin molded body 101 and form a roughened layer provided with unevenness on the surface. In addition, when the resin molded body 101 includes an elastomer which dissolves in the etching solution, the elastomer present in the vicinity of the surface of the resin molded body 101 is preferably removed together with the calcium carbonate.

Examples of the etching method include acid processing. Specific examples of acids used in the acid processing include chromic acid, sulfuric acid, and the like. For example, in a case where the acid used is chromic acid only, it is possible to appropriately set the etching conditions according to the type of components such as the phenol resin included in the resin molded body 101, for example.

In addition, after the acid processing and before forming the plating layer 103, it is preferable to neutralize the surface of the resin molded body 101 by washing.

In addition, in the step of forming the plating layer 103, the first plating layer 105 and the second plating layer 107 are formed sequentially using a known method according to the type of metal forming the plating film and the plating method. For example, a seed layer is formed on the roughened surface of the resin molded body 101 and the metal film is grown using the seed layer as a base point.

In the present embodiment, since a roughened layer is formed on the resin molded body 101, it is possible to form the first plating layer 105 in which a plating film is filled inside a recess provided in the roughened layer. For this reason, it is possible to obtain a plating layer 103 having excellent adhesion to the resin molded body 101.

Through the above, it is possible to obtain the molded body 100 shown in FIG. 1.

There is no limitation on the applications of the molded body 100 obtained in the present embodiment and development is possible for various applications, for example, use is possible for aircraft parts, automotive parts, parts for electronic devices, parts for household electrical appliances, parts for industrial devices, and the like.

In particular, it is possible to suitably use the molded body 100 for members in which the plating layer 103 functions as a heat diffusing member, members in which the plating layer 103 functions as an electromagnetic wave shield, or the like, for example, use is possible in parts of inverters, parts of air conditioners, and the like.

Description was given of the embodiments of the present invention, but the above are examples of the present invention and it is also possible to adopt various configurations other than the above.

EXAMPLES

A detailed description will be given below of the present embodiment with reference to Examples and Comparative Examples. The present embodiment is not limited in any way to the descriptions of these Examples.

Examples 1 to 4 and Comparative Examples 1 to 3

(Preparation of Resin Composition)

For each of the Examples and each of the Comparative Examples, the resin compositions for sealing were prepared as follows. That is, a granular molding material (phenol resin composition) was obtained by kneading a mixture in which each component was blended according to the blending amounts shown in Table 1 with heating rolls having different rotation speeds and then grinding the cooled mixture into a sheet. Here, as the kneading conditions of the heating rolls, the rotation speed was 20 rpm/14 rpm on the high-speed side/low-speed side, the temperature was 90° C./20° C. on the high-speed side/low-speed side, and the kneading time was 5 minutes to 10 minutes.

The details of each component in Table 1 are as follows. In addition, the blending ratio of each component shown in Table 1 indicates the blending ratio (% by mass) with respect to the entire resin composition.

- (A) Phenol resin 1: Resol-type phenol resin, PR-53529 (manufactured by Sumitomo Bakelite Co., Ltd.)
- (A) Phenol resin 2: Resol-type phenol resin, PR-51723 (manufactured by Sumitomo Bakelite Co., Ltd.)
- (A) Phenol resin 3: Novolac-type phenol resin, A-1087 (manufactured by Sumitomo Bakelite Co., Ltd.)
- Curing aid 1: Slaked lime
- Filler 1: Glass fibers, CS3E479 (manufactured by Nitto Boseki Co., Ltd.), average fiber diameter 11 μm, average fiber length 3 mm
- Filler 2: Crushed silica, RD-8 (manufactured by Tatsumori Ltd.), $d_{50}$=15 μm,
- (B) Calcium carbonate 1: NS #100 (manufactured by Nitto Funka Kogvo K.K.), average particle diameter $d_{50}$=5.3 μm, ratio of particles with a particle diameter of 0.1 μm or more and 1 μm or less: 9.5%, ratio of particles with a particle diameter of 1 μm or more and 10 μm or less: 80%
- (B) Calcium carbonate 2: Escaron #800 (manufactured by Sankyo Seifun Co., Ltd.), average particle diameter $d_{50}$=3.0 μm, ratio of particles with a particle diameter of 0.1 μm or more and 1 μm or less: 27%, ratio of particles with a particle diameter of 1 μm or more and 10 μm or less: 73%
- (C) Elastomer 1: Mixture of butadiene acrylonitrile copolymer and calcium carbonate, TR2250 (manufactured by JSR)
- (C) Elastomer 2: Alkyl acetalized polyvinyl alcohol, Esrec BH-3 (manufactured by Sekisui Chemical Co., Ltd.)
- (C) Elastomer 3: Alkyl acetalized polyvinyl alcohol, Esrec BL-1 (manufactured by Sekisui Chemical Co., Ltd.)
- Mold release agent 1: Calcium stearate (manufactured by Tokyo Chemical Industry Co., Ltd.)
- Coloring agent 1: Carbon black, #5 (manufactured by Mitsubishi Chemical Corporation)

The following measurements were performed on the resin compositions obtained in each Example. The results are shown together in Table 1.

(Method for Measuring Physical Properties of Resin Molded Body)
(Method for Measuring Linear Expansion Coefficient α)

For the resin compositions obtained in each Example, flexural test pieces were molded at 175° C. for 3 minutes and then subjected to a curing process in an oven at 180° C. for 4 hours to obtain cured product test pieces. TMA measurements in the flow direction were performed on the obtained test pieces. The TMA measurements were performed at a temperature rise rate of 5° C./min and the average linear expansion coefficient at 40° C. to 150° C. was used as a.

(Evaluation Method)
(Method for Measuring Peel Strength)

For the resin composition obtained in each Example, a molded product of 125 mm square×1.5 mm thickness was molded under conditions of 175° C. for 90 seconds to obtain a resin molded body. After that, chromic acid etching was carried out at 65° C. for 20 minutes on the plating film-forming surface of the resin molded body obtained by performing the curing process in an oven at 180° C. for 8 hours to roughen the plating film-forming surface. The etching solution was an aqueous solution including chromic anhydride and sulfuric acid in the concentrations below, respectively.

(Etching Solution)

| Component | Concentration |
| --- | --- |
| Chromic anhydride | 400 g/L |
| Sulfuric acid | 400 g/L |

After that, a 0.1 μm to 3 μm Ni film was formed on the etched surface of the resin molded body by electroless Ni plating and then a 10 μm to 50 μm Cu film was formed by electrolytic Cu plating. The plating width was set at 10 mm. The composition of the plating solution (aqueous solution) used in each plating step is shown below.

(Plating Solution for Electroless Ni Plating)

| Component | Concentration |
| --- | --- |
| Nickel sulfate | 20 g/L |
| Sodium acetate | 5 g/L |
| Sodium hypophosphite | 10 g/L |
| Sodium citrate | 5 g/L |

(Plating Solution for Electrolytic Cu Plating)

| Component | Concentration |
| --- | --- |
| Copper sulfate | 200 g/L |
| Sulfuric acid | 50 g/L |

The strength when the plating is peeled off orthogonally from the molded body obtained as described above, that is, the maximum peel strength when a 90° peel test is performed, is set as the peel strength. The method for measuring the strength is as follows. Measurement method: One end of a copper foil was peeled off to an appropriate length and then attached to a support bracket and the tip of the peeled copper foil was grasped with a gripping tool and continuously peeled off to approximately 50 mm at a speed of approximately 50 mm per minute in the direction where the tensile direction was orthogonal to the surface of the copper foil. The lowest value of the load in this period was set as the peel-off strength [N/cm].

(Method for Measuring Flexural Strength and Flexural Modulus)

For the resin compositions obtained in each Example, in accordance with JIS K 6911, flexural test pieces were molded under curing conditions of 175° C. for 3 minutes and then cured at 180° C. for four hours to obtain test pieces. The strength of the test piece when broken by a method in accordance with JIS K 6911 was set as the flexural strength. In addition, the flexural modulus was determined from the slope of the stress-strain curve in the elastic region.

TABLE 1

|  |  | Example 1 | Example 2 | Example 3 | Example 4 | Comparative example 1 | Comparative example 2 | Comparative example 3 |
|---|---|---|---|---|---|---|---|---|
| Component (% by mass) | (A) Phenol resin 1 | 16 | 16 | 20 | 25 | 16 | 10.0 | 16 |
|  | (A) Phenol resin 2 | 14 | 14 |  | 36 | 14 | 20.0 | 14 |
|  | (A) Phenol resin 3 | 8 | 8 | 16 | 15 | 8 | 6.0 | 8 |
|  | Curing aid 1 | 1.2 | 1.2 | 2 | 2.5 | 1.2 | 1.0 | 1.2 |
|  | Filler 1 | 45 | 45 |  |  | 45 | 55 | 55 |
|  | Filler 2 |  |  | 20 | 3 | 10 | 2.0 | 3 |
|  | (B) Calcium carbonate 1 | 10.0 |  | 40 | 10 |  |  |  |
|  | (B) Calcium carbonate 2 |  | 10 |  |  |  |  |  |
|  | (C) Elastomer 1 |  |  |  | 2 | 1.5 | 2.0 |  |
|  | (C) Elastomer 2 |  |  |  |  | 1.5 |  |  |
|  | (C) Elastomer 3 | 3.0 | 3 |  |  |  |  |  |
|  | Mold release agent 1 | 1.8 | 1.8 | 0.6 | 4.5 | 1.8 | 3 | 1.8 |
|  | Coloring agent 1 | 1.0 | 1.0 | 1.4 | 2 | 1.0 | 1.0 | 1.0 |
|  | Total | 100 | 100 | 100 | 100 | 100 | 100 | 100 |
| Peel strength | (N/cm) *Etching 20 minutes | 1.4 | 2.2 | 2.5 | 1 | 0.5 | 0.5 | 0.5 |
| Flexural strength | E(180° C. 4 hours) (MPa) | 191 | 184 | 92 | 90 | 250 | 248 | 202 |
| Flexural modulus | E(180° C. 4 hours) (GPa) | 14.0 | 13.6 | 12.0 | 10.5 | 15.5 | 16.7 | 15.2 |
| α | E(180° C. 4 hours) (ppm/° C.) | 12 | 14 | 26.8 | 60 | 12 | 10.6 | 11 |

From Table 1, in the molded bodies obtained by using the resin composition in each Example, the peel strength of the plating film from the resin molded body was higher than that of the Comparative Examples. Accordingly, using the resin compositions in each of the Examples makes it possible to improve the adhesion between the plating film and the resin molded body when the plating film is formed on the surface of the resin molded body.

In addition, the resin compositions obtained in each of the Examples had preferable characteristics in terms of the flexural strength, flexural modulus, and linear expansion coefficient of the cured product.

This application claims priority based on Japanese Application JP 2019-146715 filed on Aug. 8, 2019, the entire disclosure of which is incorporated herein.

REFERENCE SIGNS LIST

100: Molded body
101: Resin molded body
103: Plating layer
105: First plating layer
107: Second plating layer

The invention claimed is:

1. A phenol resin composition used in a resin molded body for which a plating process is applied to a surface, the phenol resin composition comprising the following components (A), (B) and a filler other than the component (B):
   (A) a phenol resin; and
   (B) calcium carbonate,
   wherein the content of the component (B) in the resin composition is 1% by mass or more and 50% by mass or less with respect to the entire resin composition,
   an average particle diameter d50 of the component (B) is 0.5 µm or more and 20 µm or less, and
   the content of the filler other than the component (B) in the resin composition is 0.5% by mass or more and 50% by mass or less with respect to the entire resin composition.

2. The phenol resin composition according to claim 1, wherein the component (A) includes a resol-type phenol resin and a novolac-type phenol resin.

3. The phenol resin composition according to claim 1, wherein an average particle diameter $d_{50}$ of the component (B) is 0.1 µm or more and 30 µm or less.

4. The phenol resin composition according to claim 1, wherein the component (A) includes a resol-type phenol resin and a novolac-type phenol resin, and
   an average particle diameter $d_{50}$ of the component (B) is 0.1 µm or more and 30 µm or less.

5. The phenol resin composition according to claim 1, further comprising:
   a component (C), which is an elastomer.

6. The phenol resin composition according to claim 5, wherein the component (C) includes one or two or more selected from the group consisting of a butadiene rubber, a butadiene acrylonitrile copolymer, and a modified polyvinyl alcohol.

7. The phenol resin composition according to claim 5, wherein the resin molded body has a sea-island structure and the component (C) is present in an island phase.

8. The phenol resin composition according to claim 1, wherein, for a cured product obtainable by curing the phenol resin composition at 180° C. for 4 hours after molding at 175° C. for 3 minutes, a linear expansion coefficient in a range of 40° C. to 150° C., measured by thermomechanical analysis at a temperature rise rate of 5° C./min, is 5 ppm/° C. or higher and 25 ppm/° C. or lower.

9. The phenol resin composition according to claim 1, wherein a flexural strength of a cured product obtainable by curing the thermosetting resin composition at 180° C. for 4 hours after molding at 175° C. for 3 minutes is 50 MPa or more.

10. The phenol resin composition according to claim 1, wherein a flexural modulus of a cured product obtainable by curing the thermosetting resin composition at 180° C. for 4 hours after molding at 175° C. for 3 minutes is 10.0 GPa or more.

11. A molded body comprising:
a cured product of the phenol resin composition according to claim 1; and
a plating layer provided in contact with a surface of the cured product.

12. The molded body according to claim 11, wherein the cured product has a roughened layer on a bonding surface with the plating layer, and the plating layer is provided inside a recess provided in the roughened layer.

13. The molded body according to claim 11, wherein the plating layer is a layer including one or two or more selected from the group consisting of Cu, Ni, Al, Fe, Au, and an alloy thereof.

14. The molded body according to claim 11, wherein a thickness of the plating layer is 0.1 μm or more and 60 μm or less.

* * * * *